(12) United States Patent
Palmer

(10) Patent No.: US 9,702,315 B1
(45) Date of Patent: Jul. 11, 2017

(54) SYSTEM FOR ENHANCED VEHICLE PERFORMANCE AND EFFICIENCY

(71) Applicant: Brian Palmer, Orem, UT (US)

(72) Inventor: Brian Palmer, Orem, UT (US)

( * ) Notice: Subject to any disclaimer, the term of this patent is extended or adjusted under 35 U.S.C. 154(b) by 0 days.

(21) Appl. No.: 14/514,125

(22) Filed: Oct. 14, 2014

Related U.S. Application Data

(63) Continuation-in-part of application No. 14/510,994, filed on Oct. 9, 2014, now Pat. No. 9,481,288, which is a continuation of application No. 13/658,464, filed on Oct. 23, 2012, now Pat. No. 8,884,749.

(51) Int. Cl.
*B60Q 1/00* (2006.01)
*F02D 43/00* (2006.01)

(52) U.S. Cl.
CPC .............. *F02D 43/00* (2013.01); *B60Q 1/00* (2013.01)

(58) Field of Classification Search
CPC G07C 5/0808; G07C 5/0858; G07C 5/08588; G07C 2205/02; G07C 9/00309; G07C 2209/04
USPC ................ 340/438, 439; 701/29, 32, 36, 49
See application file for complete search history.

(56) References Cited

U.S. PATENT DOCUMENTS

| | | | |
|---|---|---|---|
| 5,835,873 A * | 11/1998 | Darby | B60R 21/01 180/268 |
| 6,795,760 B2 * | 9/2004 | Fuller | G07C 9/00309 307/10.1 |
| 6,807,469 B2 * | 10/2004 | Funkhouser | G07C 5/0808 340/438 |
| 7,920,102 B2 * | 4/2011 | Breed | B60K 35/00 340/991 |
| 8,718,905 B2 * | 5/2014 | Mosher | F02D 28/00 701/101 |
| 2005/0177288 A1 * | 8/2005 | Sullivan | B60W 50/02 701/36 |
| 2008/0033609 A1 * | 2/2008 | Razavi | G01M 17/00 701/31.4 |
| 2008/0147268 A1 * | 6/2008 | Fuller | B60R 25/24 701/33.4 |
| 2009/0184812 A1 * | 7/2009 | Drew | B60K 35/00 340/438 |
| 2010/0023198 A1 * | 1/2010 | Hamilton | B60R 16/03 701/31.4 |
| 2012/0203441 A1 * | 8/2012 | Higgins | G07C 5/0858 701/102 |

* cited by examiner

*Primary Examiner* — Hung T Nguyen
(74) *Attorney, Agent, or Firm* — ColterJennings

(57) ABSTRACT

A system for monitoring and controlling operating parameters of a moving vehicle comprises a device adapted to be removably attached to a vehicle diagnostic data port. The device communicates through the vehicle diagnostic data port with various vehicle electronic control modules (such as an engine, transmission, exhaust, or other control modules). The device monitors vehicle operating parameters or conditions to detect when vehicle performance or efficiency or operation may be altered in a useful way. If so, the device commands the vehicle electronic control modules to alter the normal vehicle behavior to perform a different behavior. The device may be removable, and may command a moving or stationary vehicle. The device may also monitor and control an aftermarket exhaust valve attached to a vehicle, based on monitored vehicle operating parameters and conditions.

30 Claims, 7 Drawing Sheets

SYSTEM FOR ENHANCED VEHICLE PERFORMANCE AND EFFICIENCY

CROSS-REFERENCE TO RELATED APPLICATIONS

This application claims the benefit of the filing date of U.S. patent application Ser. No. 14/510,994, filed Oct. 9, 2014, for "Driver Information and Alerting System," and of U.S. patent application Ser. No. 13/658,464 filed Oct. 23, 2012, now U.S. Pat. No. 8,884,749, and titled "Driver Information and Alerting System," the disclosures of both of which are hereby incorporated herein in their entirety by this reference. This application relates generally to the subject matter of U.S. patent application Ser. No. 12/271,633 filed Nov. 14, 2008, now U.S. Pat. No. 8,881,038, for "Method of Rendering Dynamic Vehicle Telemetry on a Graphical Display"; Ser. No. 14/495,697 filed Sep. 24, 2014 for "Method of Rendering Dynamic Vehicle Telemetry on a Graphical Display"; Ser. No. 13/860,428 filed Apr. 10, 2013 for "System for Advertising Vehicle Information Wirelessly"; Ser. No. 13/112,402, filed May 20, 2011, now U.S. Pat. No. 8,532,866, for "Concurrent Vehicle Data Port Communication System"; and Ser. No. 14/013,940 filed Aug. 29, 2013, now U.S. Pat. No. 8,897,952, for "Vehicle Diagnostic Communications System and Application"; the disclosures of each of which are incorporated herein by this reference.

BACKGROUND

This application relates generally to a method and system for monitoring and improving vehicle performance, efficiency, and other vehicle operating parameters in a vehicle by altering one or more of those parameters, for example, to reduce fuel consumption or to obtain other benefits.

Since at least 1996, every passenger car and light-duty truck sold in the United States has had a computer diagnostic data connection port, such as an OBD1, OBD2/OBD-II, or SAE-J1962 port. Most heavy-duty trucks currently sold in the United States also include a computer diagnostic port, usually referred to as a J1708 port or a J1939 port. Some vehicles also include one or more additional data ports, sometimes located in the passenger compartment, the trunk, or the engine bay. These data ports permit a mechanic, vehicle operator, or other user to connect to the vehicle and retrieve vehicle diagnostic data and operating parameters, that is, data about the vehicle, including engine, fuel system, brake system, and other data. Scan tools have been developed to permit mechanics and repair technicians to connect to the vehicle and monitor sensor data in real time as well as read and clear trouble codes and reset engine operating data and learned values. Some advanced scan tools even allow the mechanic to temporarily test vehicle components by actuating solenoids, altering fuel injection timing and/or open or close fuel injectors, altering ignition/spark timing parameters, altering variable valve timing parameters, altering variable displacement systems (for example, change cam phaser parameters), altering fuel pressure or fuel pump output parameters, commanding the transmission to stay in a specific gear, locking/unlocking the torque converter, altering transmission shift points, gear ratios, line pressure, shift firmness, or other transmission properties and numerous other tests for many vehicle components. Existing scan tools often are not designed to perform these kinds of tests while the vehicle is moving, and make it very difficult (and dangerous) for a mechanic or repair technician to perform these tests while driving the vehicle.

Many modern vehicles today also incorporate more advanced technologies such as cylinder deactivation, variable displacement, variable valve timing, dynamic exhaust flow controllers, hybrid electric systems, or even fully electric systems that may include battery packs, fuel cells, solar cells, or other electric fuel systems. Some of these technologies can reduce fuel consumption by deactivating cylinders or altering engine displacement in a predetermined way or, in the case of hybrid vehicles, completely turn off the combustion engine during idle or low acceleration periods.

Technologies such as variable valve timing can improve engine power and fuel efficiency by altering valve lift, duration, position, or overlap. This is typically done using a mechanical system controlled by the vehicle engine electronic control module. Many existing technologies implement variable valve timing, including cam switching, cam phasing, oscillating cam, eccentric cam drive, three-dimensional cam lobe, two shaft combined cam lobe profile, coaxial two shaft combined cam lobe profile, helical camshaft, or even camless engine designs where a camshaft is not used to control valve timing. These systems can be electro-mechanical, hydraulic, stepper motor, or pneumatic in nature. Regardless of the actual mechanical system used in the implementation of variable valve timing, the net effect allows the engine to produce greater power when needed while also being more fuel efficient by varying the valve timing (for one or more intake or exhaust valves or both or some other combination of valves) at low engine speed versus high engine speed for example.

Technologies such as variable displacement (also known as cylinder deactivation) can improve engine power and fuel efficiency by altering the effective engine displacement, usually by way of physically disabling air flow into or out of a predetermined cylinder or range of cylinders. This is distinct from variable valve timing technology, as it does not vary the actual valve timing (which has the net effect of changing the cam profile in real time), but rather typically involves completely stopping all valve activity on a predetermined deactivated cylinder. Many implementations exist for variable displacement cylinder deactivation. One such implementation alters oil pressure to collapse lifters so that the valves cannot be actuated. Another utilizes multiple locked-together rocker arms per valve, which can then be unlocked to completely disable valve activity.

Technologies such as variable intake geometry (known by various names, including a variable-length intake manifold, variable intake manifold, and variable intake system) seek to improve engine power and fuel efficiency by altering the length of the intake manifold runner or intake tract. This can be done, for example, using a valve that diverts air flow through either a shorter or a longer intake port, each having a different length or volume. Other methods implement variable intake geometry, but regardless of the technology used, variable intake geometry can be useful to effect different air flow properties such as swirl and pressurization at different engine speed ranges.

Other technologies such as dynamic exhaust flow control can improve engine power as well as affect the exhaust tone, noise and sound. For example, some vehicles utilizing dynamic exhaust flow control keep the engine exhaust restricted so as to flow through additional muffling devices to reduce noise. Then, when the vehicle operator requests additional power or acceleration (i.e. by way of the accelerator pedal), the vehicle unrestricts the exhaust flow to provide additional power, usually with the side effect of increased exhaust noise. The additional exhaust noise may or may not be desirable, depending on personal preference.

Typically, the vehicle limits the unrestricted exhaust flow operation to predetermined engine RPM ranges or predetermined minimum acceleration pedal positions, or other predetermined limits based on other vehicle operating parameters.

These changes and technologies are typically executed by installing additional mechanical and electrical vehicle control systems as well as by calibration modifications through the electronic control modules such as the engine control module as factory original equipment. Typically, vehicle manufacturers provide diagnostic test and control commands, available through a data port, to test these systems and technologies in the event of a failure or problem (for example, by actuating cam phasers or fuel injectors). Nevertheless, these more technologically advanced and fuel efficient vehicles can also be supplemented with an additional system to further reduce fuel consumption and improve fuel economy, vehicle performance, and efficiency.

In the past, many different systems and devices have been created to improve the power, performance, efficiency, fuel economy and gas mileage of a vehicle. Often these systems are mechanical in nature and involve installing a device into the intake piping to help regulate airflow or installing aftermarket fueling systems or modifiers such as water or methanol injection. Some systems need to be spliced into the wiring harness so that they sit between the engine control computer and the engine's sensors. By altering sensor voltages, these kind of systems can then "trick" the engine control computer into thinking the sensor is reading a different value than is actually present. Given the altered sensor data, the engine control module may then decide to utilize different fuel parameters. Other kinds of systems may involve even more complicated mechanical components that are capable of stopping the engine and then restarting it later in an effort to improve fuel economy, or installing an electric motor to assist the combustion engine on demand.

Many companies also manufacture aftermarket flashing or tuning products that will reprogram the engine control computer with different calibrations, tables, curves and other operating parameters such as spark/timing, fuel settings, shift points, temperature conditions and other operating parameters and settings. Most systems of this kind are primarily designed to produce more horsepower, but some are advertised as useful to improve fuel economy. One of the drawbacks to such a system is that it permanently alters the engine control computer with a non-OEM/non-factory calibration that often cannot be serviced by repair shops and that usually voids the factory warranty on the engine.

Some companies also manufacture aftermarket exhaust valves, commonly referred to as a "cutout." Some exhaust cutouts are electric in nature, allowing the vehicle operator to manually operate the cutout using a physical switch or button attached or connected to the cutout. These types of exhaust valves are always in an open position or a closed position, depending on the state of the physical switch or button used to operate them. Other exhaust cutouts are mechanical in nature, allowing the vehicle operator to manually operate the cutout using a physical lever or cable. Other mechanical exhaust cutouts use a block-off plate with bolts or fasteners that can be manually removed to alter exhaust flow or sound.

Other aftermarket exhaust products designed to work with OEM/factory installed exhaust flow control valves simply cut power to the entire exhaust flow control system to get it to change the state of the valve (as the valve usually has a different resting/power-off state from the active/power-on state), rather than directly controlling the valve itself. These kinds of systems are often limited because they cannot directly control the valve itself and by physically cutting power to the entire system, these systems may introduce trouble codes or faults into the vehicle.

SUMMARY

The present system includes a device removably attached to the vehicle data port that monitors vehicle operating parameters and conditions and communicates with the engine control module or other electronic control modules within the vehicle. In some embodiments, the present system requires no permanent installation or changes to the vehicle and permits the user to unplug and remove the device from the vehicle when no longer needed or wanted. In one embodiment, the device is attached or connected to or in communication with an aftermarket exhaust valve.

The present device understands vehicle communications protocols and while monitoring vehicle operating parameters and conditions and communicating with the vehicle electronic control modules, can send diagnostic commands to the control modules to instruct them in various ways to perform a "different behavior" that may alter vehicle performance, efficiency, or fuel economy by activating/deactivating individual cylinders or fuel injectors, altering fuel pressure, altering transmission functionality, altering factory exhaust valve parameters or other kinds of commands. In one embodiment, the device sends communications and commands to an aftermarket exhaust valve to alter exhaust flow, noise, tone, or sound.

The device is designed to be used while the vehicle is moving and constantly monitors the vehicle conditions, sensors, data, and other operating parameters so that, for example, it does not command the combustion engine to do anything damaging or contrary to the drivers actions. For instance, the device can monitor the accelerator pedal to see when the driver is trying to accelerate. In case of acceleration, the device could ensure that it is not commanding any control modules to cut fuel delivery or otherwise reduce engine power in an effort to save fuel.

The device may include wireless and wired (such as USB) connections to allow the vehicle operator or other user to configure of the device to customize features, settings, and options. The device may also include a built-in switch to allow the vehicle operator or other user to customize the device or to switch profile settings while the vehicle is in motion by simply moving the switch to the desired position. The device may also include a user configuration menu system that allows the vehicle operator or other user to perform customization and configuration tasks while driving.

The device is capable of monitoring existing factory installed vehicle buttons, switches, knobs, and sensors, and also allows the user to use one of these items (that is, the buttons, switches, knobs, sensors) to enter a user configuration menu system and perform customization and configuration tasks. As one example, the device could monitor cruise control buttons and, when cruise control is not active, re-purpose some of the cruise control buttons to assist in user configuration.

Using the factory installed vehicle buttons allows the device to provide for user configuration without the need for an additional touch input display, keyboard, or other peripheral input accessory connected to the device. If more advanced sensors become available as factory installed items in vehicles, it will be possible for the device to monitor for spoken or physical "gestures" that can be used for user configuration. For example, if a vehicle comes factory equipped with a microphone or visual sensor, the device could monitor this sensor for a specific spoken gesture or physical gesture, such as a hand wave, and in response take some user-configured action.

The device includes predetermined vehicle operating parameter limits and also permits the user to configure those or additional vehicle operating parameter limits. The device then monitors vehicle operating parameters and when a predetermined/configured limit is exceeded the device may send commands to the vehicle to alter vehicle operating parameters in response. Alternatively, the device may send commands to aftermarket devices, such as an aftermarket exhaust valve, in response. The device may also include peripheral input ports to acquire other data that can then be monitored and used as a configured limit.

The device also includes a feature that permits the user to generate new data based on existing vehicle or peripheral input data. That is, the user may configure the device to take data from the vehicle data port and, using custom calculations, formulas or algorithms, generate new information. For example, the user could configure the device to calculate horsepower based on a change in vehicle speed, factoring in the known vehicle mass. These generated or calculated parameters could then be monitored and used as a configured limit.

BRIEF DESCRIPTION OF THE DRAWINGS

Other features and advantages of the present invention will be apparent from the following Detailed Description taken in conjunction with the accompanying Drawings, in which.

DETAILED DESCRIPTION

Modern vehicles typically have a data port, such as an On-Board Diagnostics II port ("OBD-II port"). These data ports are used to communicate with the on-board electronics and diagnostics systems of the vehicle, typically using a computing device or specialized hand-held OBD-II diagnostic appliance. According to the present disclosure, a device communicates with the OBD-II port (or other similar port). The device monitors the vehicle operating parameters and conditions and sends communications and commands to various vehicle electronic control modules or aftermarket vehicle devices, which communications and commands alter the factory behavior of those modules or aftermarket devices based on what the driver (or other occupants of the vehicle) or user of the device wants.

Figure 1:
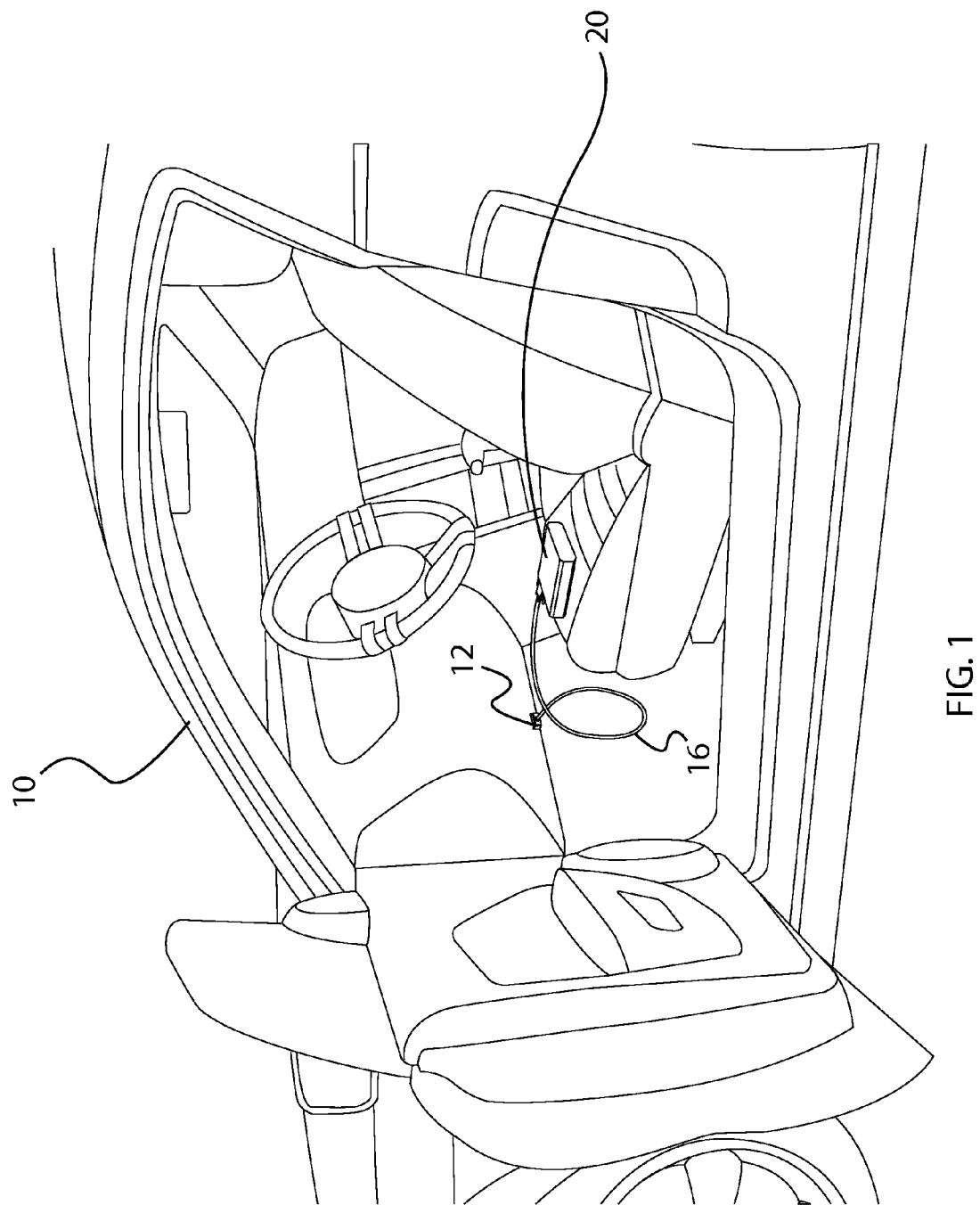
FIG. 1 depicts a perspective view of an exemplary interior of a vehicle having a data port in which the present system may be deployed.
Figure 2:
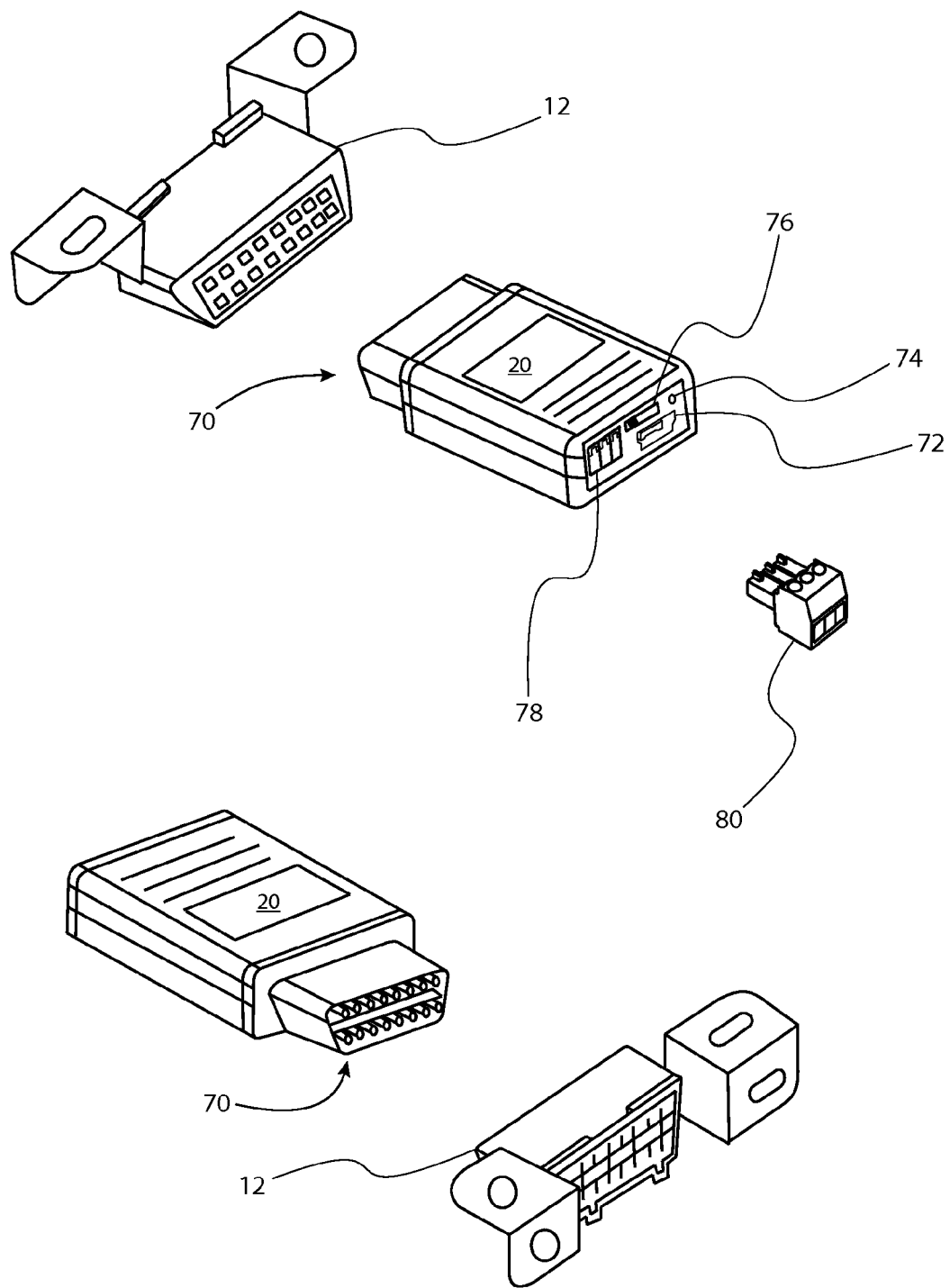
FIG. 2 depicts a vehicle diagnostic data port and a device that attaches to the vehicle diagnostic data port and has an analog input port and corresponding input connector, USB port, user configuration switch, and status LEDs.

As depicted in the FIGURES, a vehicle 10 includes at least one vehicle data port 12, which is typically an OBD-II port but may be other data ports. In the embodiment depicted in FIG. 1, a device 20 connects to the data port 12 through a cable 16. As depicted in FIG. 2, according to another embodiment the device 20 plugs directly into the port 12, without using a communications cable 16.

Modern vehicles often come equipped with numerous features that employ a variety of visual displays as well as a sophisticated audio system. Vehicles also come equipped with various switches, buttons, knobs, sensors, or other controls that operate one or more of those displays or vehicle systems. For example, as depicted in FIG. 3, a vehicle may incorporate a range of gauges, lights and displays, such as a speedometer 22, a multi-function instrument cluster display 24 (which often shows such things as odometer data, trip odometer data, outside temperature data, and vehicle service data), a tachometer 26, a fuel gauge 28, a temperature gauge 30, an oil pressure gauge 32, a battery gauge 34, and various warning indicator lights 38.

Figure 3:
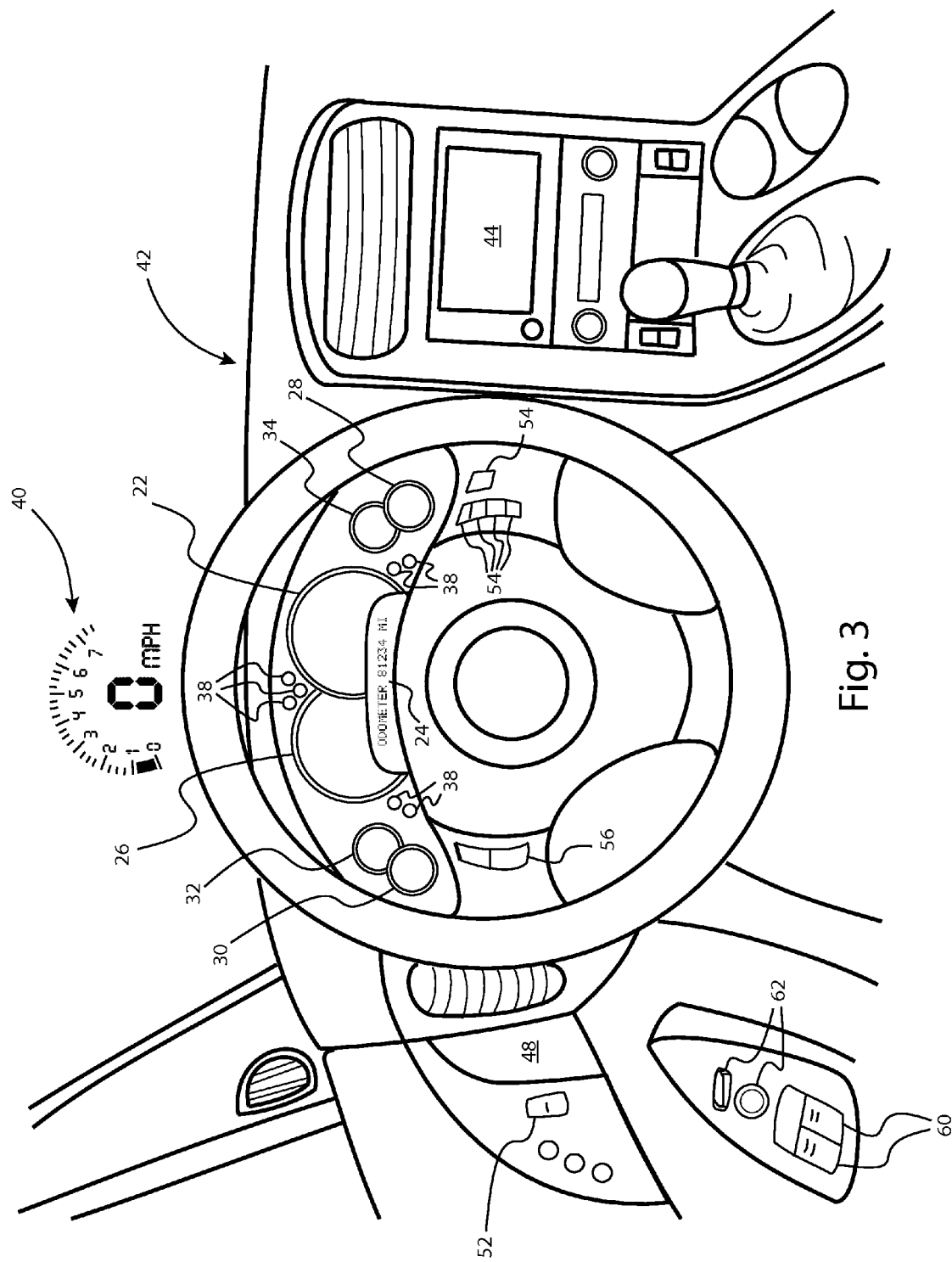
FIG. 3 depicts an exemplary vehicle dashboard incorporating a heads-up display, navigation radio display and an instrument cluster having a display, gauges, and visual warning lights, with the displays showing information as preset at the factory.
Figure 4:
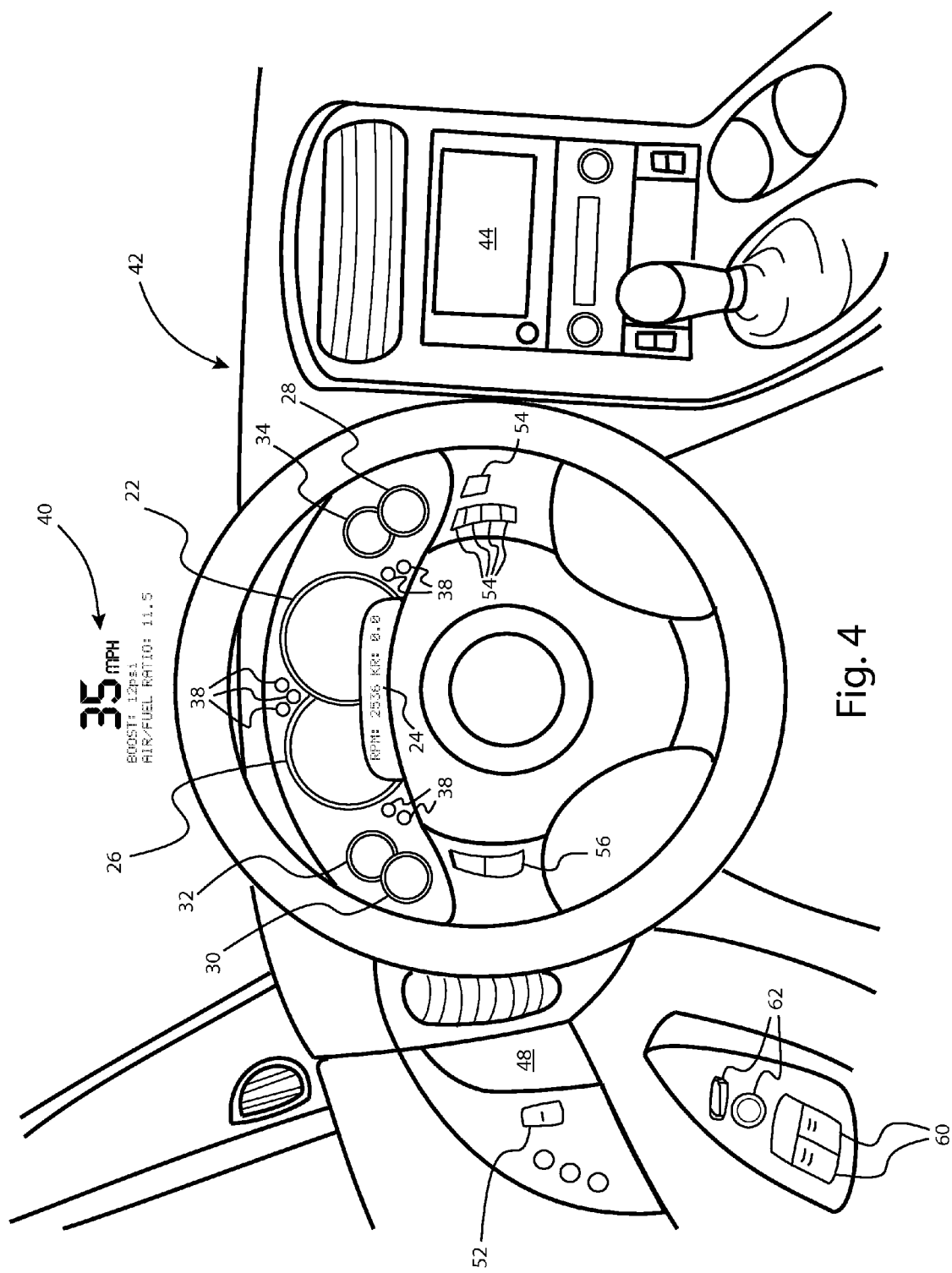
FIG. 4 depicts the dashboard of FIG. 3 with certain of the displays showing customized information as configured by the vehicle operator or other user.

The vehicle shown in FIG. 3 also has a heads-up display 40. A typical heads-up display 40 projects vehicle information up from the dashboard 42, off the vehicle windshield and into the driver's eyes (when the driver looks slightly down from the road). The heads-up display 40 often is configured at the factory to display a small sub-set of the data shown in the other gauges, such as vehicle speed (from the speedometer 22) and engine RPM (from the tachometer 26).

FIG. 3 also depicts a navigation radio display 44 (which is a combined radio and GPS) in the middle of the dashboard 42. Typically, the vehicle includes a sound system and speakers 48. The vehicle may also include such buttons, knobs, and switches as a door lock/unlock button or rocker switch 52, a plurality of radio control buttons and switches 54 mounted on the steering wheel, cruise control buttons and switches 56, power window switches 60, a set of mirror control knobs, switches and buttons 62, and a wide variety of other driver controls for the various systems in the vehicle (including the horn, the air conditioning and heating units, and other known vehicle systems).

Each of these gauges, warning lights and other displays are configured at the factory to show different vehicle data, such as vehicle speed, engine RPM, vehicle odometer, radio station, mapping information, telephone calling information, and various other types of information and data. The various knobs, buttons and switches in the vehicle come pre-configured (from the factory) to control the various vehicle systems, such as the windows, cruise control, radio, door locks, interior lighting, air conditioning and heating, and other vehicle systems. The device 20 communicates through the OBD-II port 12 with the various vehicle systems to read information and other sensor data from the vehicle and to command vehicle displays, audible chime systems, visual warning lights, and other vehicle systems to operate as desired and as configured by the user.

As depicted in FIG. 2, the device 20 typically includes various communications ports. For example, the device 20 has an OBD-II (or other port) connector 70 that plugs into the OBD-II port 12. The device 20 may also include a USB port 72 that would permit (among other things) the device 20 to be connected to a computer, laptop, tablet or phone to permit the user to configure the device 20. The device 20 may also include indicator lights such as LEDs 74, a configurable switch 76, and a peripheral or analog input port 78. FIG. 2 also depicts a terminal block 80 that plugs into the port 78 on the device 20; the terminal block 80 accepts sensor voltage and ground wires for reading analog sensor voltages.

The present system permits a user to create a series of customized pages of vehicle data that may then be shown on one or more of the vehicle displays (such as the heads-up display 40, the navigation radio display 44, or the instrument cluster display 24). The device 20 monitors information on the OBD-II port 12 and the peripheral input port 78. The device 20 uses the data obtained from those ports in various ways, such as showing such data (as selected by the user) on one (or more) of the displays, as well as using that data to calculate other data and then showing that calculated data on the displays. In each case, the data is shown on the displays as a part of one or more user-configured pages of data.

The system permits a user to create a series of customized pages of data. Each page may contain different data, which data may come directly from the OBD-II port 12 (or peripheral input port 78) to be displayed on a given page, or the data may be calculated or derived from other data obtained from one (or both) of the ports. That is, the user may configure the device 20 to take data from the OBD-II port and, using custom calculations, formulas or algorithms, generate new information. The new information may then be included on a page, and the page shown on one of the vehicle displays. Each of the displays can be used to display different pages, and a series of pages may be created and shown on each display, with the user able to select a different page to be shown on the display using one or more of the vehicle switches or buttons.

According to the present system the device 20 makes use of the displays and warning lights built into the vehicle 10 to provide information to the operator (or other occupant or user) of the vehicle 10. The device 20 can show several "pages" of data or other information using the same display. For example, in present vehicles, the heads-up display has a somewhat limited size. Thus, the device can cause that display to present to the driver various data in series, such as by scrolling through data, or presenting sets of data for a period of time (such as few seconds or a minute or two, or even longer), and then a second "page" of data is presented (for the same or for a different period of time), and then a third "page" and a fourth or more. The number of pages is generally limited by the time it takes to display data in a useful way, by the storage/memory in the device 20, and by the user's willingness to configure pages.

The data presented may repeat in different pages, or each page may have its own unique set of data, or there may be a combination of unique pages and repetitive pages or data presentations. Other displays may be configured to provide the same or different data and the same or different pages. For example, the device 20 may be configured to display the vehicle elevation (from the vehicle GPS) on the head-up display for five seconds every minute.

The device 20 may also be configured to always display a single "page" of data on a specific display until the user or vehicle operator notifies the device 20 to change the display to a different page of data. In one embodiment of the system, the device 20 may be monitoring the door lock button 52 through the OBD-II port 12. If the doors have already been locked and the vehicle operator presses the door lock button 52 a second time, the device 20 may be configured to take this event to mean that the vehicle operator desires to change display "pages" to the next "page" in the series for that vehicle display. In another embodiment of the system, the device 20 may be monitoring the cruise control buttons 56. When the device 20 detects that a cruise control button 56 has been pressed while the cruise control is not active, the device 20 may initiate a user configured action, such as changing display pages, upon recognizing that event.

The device 20 permits a user or vehicle operator to configure a plurality of "pages" for each vehicle display. These pages may contain customized text, vehicle data, or other information as configured by the user. According to one embodiment, the device 20 assigns each unique vehicle data or information value a distinct number. This distinct number can then be used as a reference for that unique vehicle data item or information value. For example, the device 20 may assign the number 1 to mean Engine RPM and the number 2 to mean Vehicle Speed. The device 20 also allows the user to insert special identifier characters around a distinct number when configuring customized "pages" to indicate that an actual vehicle data or information value is to be shown in that position rather than plain text.

For example, in one embodiment, the device 20 utilizes curly braces (that is '{' and '}') as the special identifier characters. The user may configure the heads-up display with the text "Engine RPM: {1} Vehicle Speed: {2}". The device 20, when showing the customized text on the vehicle display, will substitute the identifiers indicated by the curly braces with the actual vehicle data or information values assigned to the respective numbers. Thus, if the vehicle were traveling at 35 miles per hour and the engine rpm is 2536, the device would show on the heads-up display the text "Engine RPM: 2536 Vehicle Speed: 35".

Figure 5:
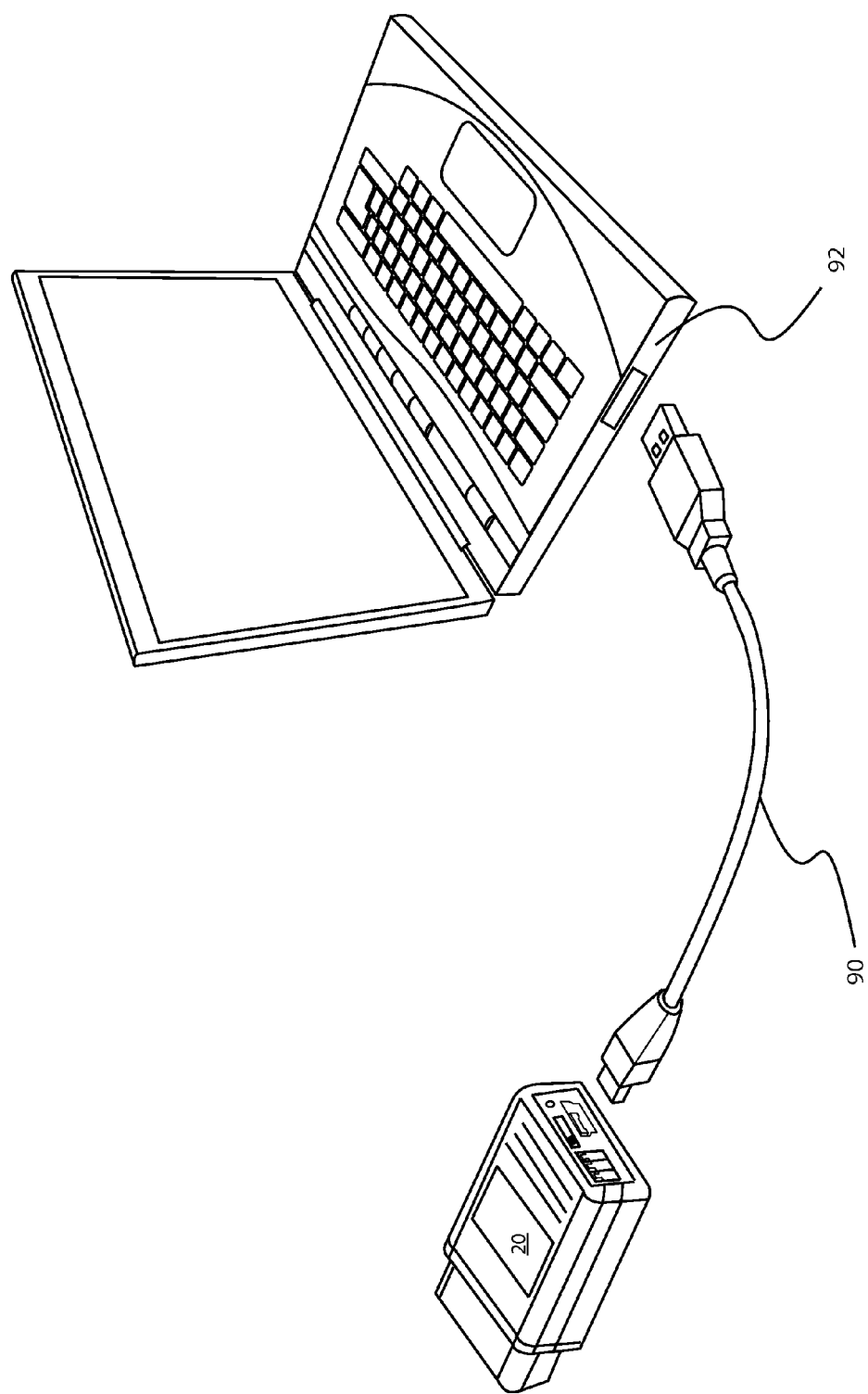
FIG. 5 depicts a perspective view of one method of connecting the device to a laptop computer.

According to one embodiment, the device 20 is disconnected from the OBD-II port 12 and connected to a computer, laptop, smartphone, or tablet by way of the USB port 72 on the device 20. According to other embodiments, the device 20 has wireless capability, or has a long communications cable 16, and thus need not be disconnected from the OBD-II port 12. As depicted in FIG. 5, after connecting the device 20 to a computer, laptop, smartphone, or tablet using the USB port 72 or other communications method, the user may configure customized display pages and other settings. The device is then plugged back into the OBD-II port 12, where it operates using the updated configuration.

A user may configure the device 20 to provide various vehicle data or other information. This includes such data as vehicle operating parameters, communications settings and commands. The values represented by this text, data, or other information may be acquired through the vehicle diagnostic port 12 or a peripheral input port 78. The parameters and values are monitored and shown on one of the built-in vehicle displays, which is updated at default intervals or at user-set intervals. The device 20 may switch to display one, two, three or more separate pages on one or more of the built-in vehicle displays.

The system/device may be configured so that it monitors whether one or more vehicle operating parameters, peripheral input data, calculations, or other information exceed one or more designated limits and, when a configured vehicle operating parameter, peripheral input data, calculations, or other information exceeds a configured limit, the device causes the vehicle systems to alert the vehicle operator or other user. The device 20 allows the user to configure the limits by way of a simple mathematical expression, which expression may include one or more conditions and special text symbols and operators to identify specific pieces of vehicle data or other information and how it is to be parsed, as is known in the art.

In one embodiment, the expression may include vehicle data identifiers preceded by the word "pid" with a distinct number in parenthesis following the word "pid" as well as conditional operators that specify how to evaluate different vehicle data or other information. For example, the expression may include a condition to check whether the data is over a specific value (>), under a specific value (<), over or equal to a specific value (>=), under or equal to a specific value (<=), equal to a specific value (==) or not equal to a specific value (!=). When more than one condition is supplied, the conditions may be separated by Boolean operators such as AND, OR, and NOT (often identified by the text symbols &&, ||, and !) to specify the relationship of one condition to the next.

For example, the user may configure the device 20 with the expression "(pid(1)>=5500) && (pid(2)>70)". In this example, the "pid" number 1 could mean Engine RPM and the "pid" number 2 could mean Vehicle Speed. As configured, this example expression would evaluate the condition as meaning if Engine RPM is greater than or equal to 5500 AND if Vehicle Speed is greater than 70. The device 20 may then take a user configured action upon detecting that the configured limit specified by this example expression has been exceeded, such as alerting the vehicle operator or other user by way of sounding a configurable audible chime or by illuminating one or more of the built-in vehicle warning lights, or by way of displaying configurable text, data, or other information on a built-in vehicle display, or by a combination of more than one of these devices.

The user may configure the device 20 to perform custom calculations, formulas, or algorithms to generate new data based on existing vehicle or peripheral input data. This new data can be shown on built-in vehicle displays or used as a configured limit to alert the vehicle operator or other user. The user configures these custom calculations using a similar mathematical expression as described earlier. For example, suppose the "pid" number 2 was assigned to mean Vehicle Speed (in kilometers per hour) and the user configured a custom calculation such as "pid(2)*0.621371" to multiply the "pid" value identified by the number 2 by the number 0.621371 to thereby convert from kilometers per hour to miles per hour. The user could then configure this example custom calculation to have a specific assigned numeric identifier of its own, which could then be used in other configured custom calculations, limits, or customized display pages.

In some embodiments, the device 20 can be removed from the vehicle and connected to an external computer (such as a desktop, laptop, tablet, smartphone, or other computing apparatus) for configuration purposes. As depicted in FIG. 5, one way to configure the device 20 involves connecting the device 20 to a laptop computer 92 by way of a USB cable 90. Using these connection methods, a user may enter configuration information into, for example, an application running on the laptop 92, and the device 20 is then updated with the new configuration by passing the instructions over the USB cable 90.

In other embodiments, the device 20 can remain connected to the vehicle and concurrently connected to such a computer for configuration purposes. Typically, but not necessarily, the device 20 stops monitoring, communicating, or commanding the vehicle while connected to such a computer. In other embodiments, the device 20 is configured with either a wired or wireless connection, thereby allowing that computer to communicate with the device 20 or the vehicle in a bidirectional manner.

The device 20 may include peripheral input ports 78 for obtaining data from external sources and acting upon that data in a predetermined way. For example, the user may connect a 0 to 5 volt wideband oxygen sensor to the peripheral input port 78 using the terminal block 80. The user may then configure the device 20 to utilize the peripheral input data from this wideband oxygen sensor in a custom calculation to output the data scaled as an air/fuel ratio or lambda value which can be shown on vehicle display "pages" or used as a configured limit.

The device 20 may contain a built-in display, display connector, or indicator lights to provide information to the vehicle operator or other user about vehicle operating conditions. The device 20 may contain a built-in speaker or audio output connector to provide audible alerts to the vehicle operator or other user about vehicle operating conditions. The device 20 may contain a means for data storage and may be configured to data log vehicle operating parameters or other vehicle information, events, and conditions.

The device 20 may switch between one or more pages being displayed on one or more of the built-in vehicle displays upon receiving an event initiated by the vehicle operator or other user. The event initiated by the vehicle operator or other user may be, for example, the action of pressing, actuating, moving, or turning a built-in vehicle button, switch, knob, or sensor or by gesturing with respect to a vehicle sensor (such as by gesturing or waving towards or in front of or in some other fashion with respect to the sensor). Alternatively, the event initiated by the vehicle operator or other user may be the action of pressing, actuating, moving, turning, or gesturing a button, switch, knob, or sensor on the device 20 or connected to the device 20 via a peripheral input port 78.

In one embodiment, the device 20 may allow the user to set up a plurality of separate distinct configurations, any of which may be selected for use by way of the configurable switch 76. For example, the user may configure one configuration to have "pages" of fuel economy and trip information and configured limits for alerts and custom calculations relating to fuel economy and trip information. The user may then configure a separate configuration to have "pages" of engine performance data and associated configured limits for alerts and related custom calculations. The user or vehicle operator may then simply switch between these separate configurations by way of the configurable switch 76 so that when the user or vehicle operator is driving across the country the fuel economy and trip information configuration is active, and when doing road racing, autocrossing, or some other performance event, the engine performance data configuration is active.

Figure 6:
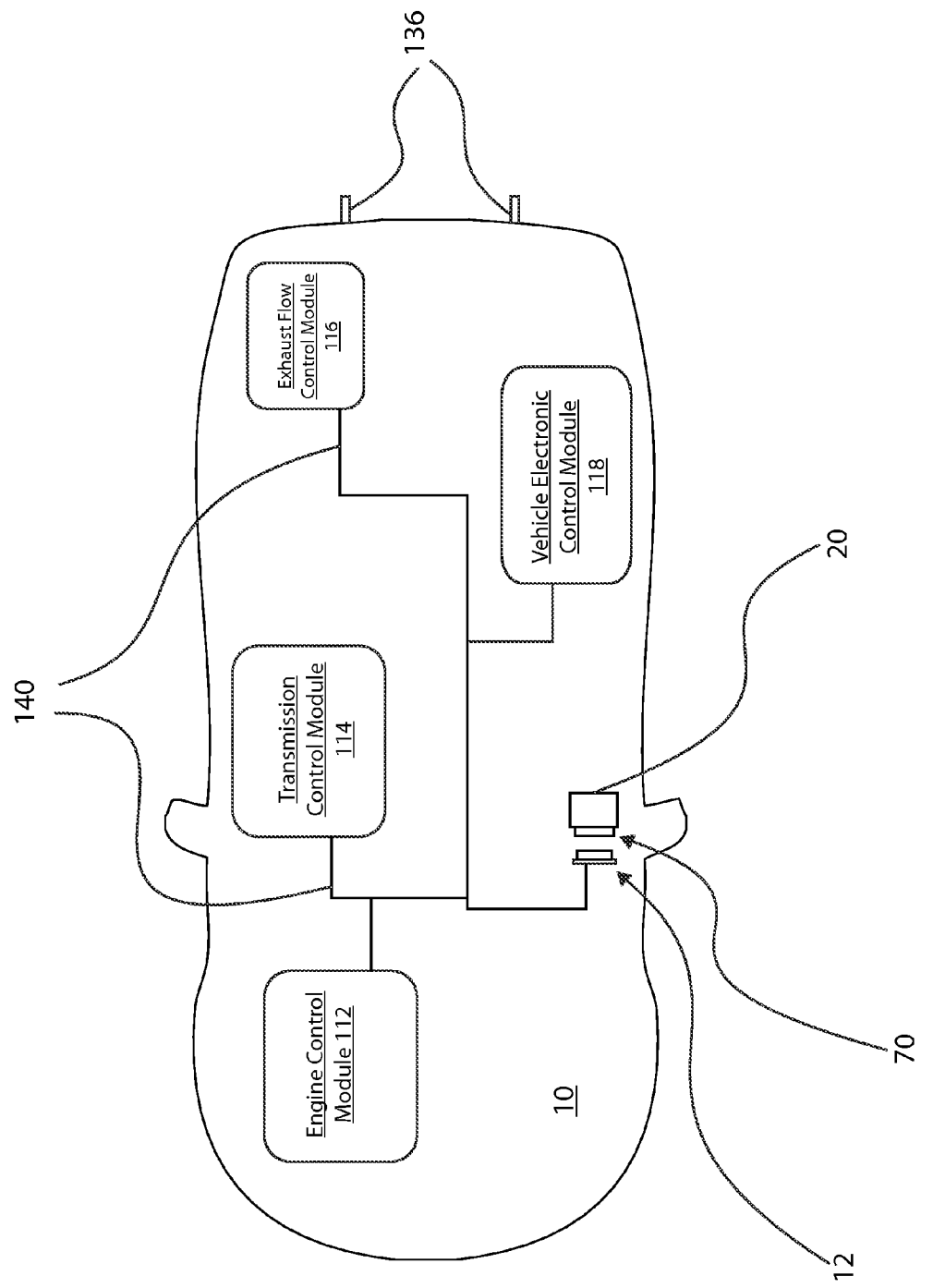
FIG. 6 depicts a schematic view of a vehicle showing various electronic control modules communicating via a data bus, and a device that attaches to a vehicle diagnostic data port.

As depicted in FIG. 6, in an exemplary vehicle 10 having exhaust pipes 136, the device 20 is attached to a vehicle data port 12 using a connector 70. Typically, the vehicle data port 12 connects the device 20 to a data bus 140 having an engine control module 112, a transmission control module 114, an exhaust flow control module 116, or other vehicle electronic control modules 118. The vehicle data port 12 (and the data bus 140) thereby allows the device 20 to communicate with, send commands to, and thereby control, the various vehicle electronic control modules 118.

Figure 7:
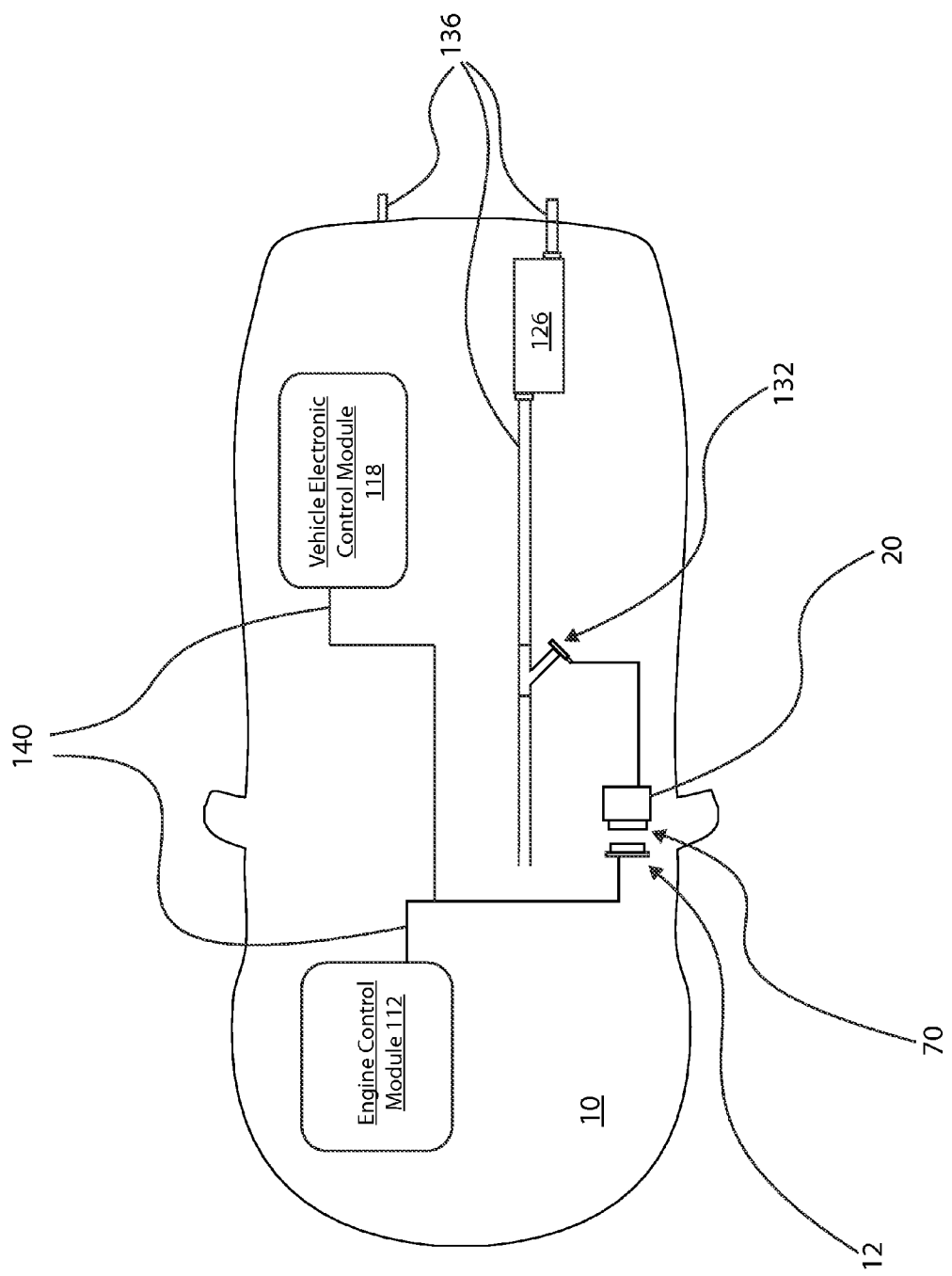
FIG. 7 depicts a schematic view of a vehicle showing electronic control modules communicating via a data bus, and an aftermarket exhaust valve installed in the exhaust pipe, which exhaust valve is connected to a device that attaches to a vehicle diagnostic data port.

As depicted in FIG. 7, in an exemplary vehicle 10 having a muffler 126 and exhaust pipes 136, the device 20 is attached to a vehicle data port 12 using a connector 70.

Typically, the vehicle data port 12 connects the device 20 to a data bus 140 having an engine control module 112, or other vehicle electronics control modules 118. The vehicle data port 12 (and the data bus 140) thereby allows the device 20 to communicate with, and collect vehicle operating parameters and conditions from, the various vehicle electronic control modules 118. In the embodiment depicted in FIG. 7, the device 20 is connected to an aftermarket exhaust valve 132 (often called a "cutout"), thereby allowing the device 20 to communicate with, or send commands to, the aftermarket exhaust valve 132.

According to the present disclosure, the device 20 may also be used to command the vehicle 10 (or the vehicle electronic control modules 118) to perform behaviors different from what the original factory-configured behaviors would have been ("Different Behaviors"), using communications and commands sent through the vehicle data port 12 to one or more vehicle electronic control modules 118, such as various vehicle electronic control modules 118 called (by some automobile makers) the engine control module 112, transmission control module 114, motor control modules, powertrain control module, anti-lock brake control module, electronic brake control module, instrument or gauge cluster, traction control system, vehicle stability control module, body control modules, chassis control modules, suspension control modules, alarm or anti-theft module, restraint module, steering control module, differential control module, fuel control module, light control module, generic electronic module, trailer brake control module, transfer case control module, exhaust flow control module 116, door/door lock/power window control modules, keyless entry control modules, tire pressure monitoring systems, radio modules, heating/ventilating/air-conditioning control modules, accessory control module, navigation systems, head-up display systems, power/heated seat control modules, infotainment control modules, or other vehicle electronic control modules, or other names for these same types of vehicle electronic control modules. These Different Behaviors include changes to the vehicle operations, including vehicle electronic control module operations, which changes may involve a variety of performance and efficiency alterations.

In some embodiments, the device 20 may send vehicle data port 12 communications and commands to a powertrain control module, for example, to perform some specific Different Behavior. In another embodiment, the device 20 may send the vehicle data port communications and commands to an engine control module 112 or to a transmission control module 114 to perform that same specific Different Behavior. It typically does not matter to which vehicle electronic control module 118 those vehicle data port 12 communications and commands are sent, as long as those vehicle data port communications and commands (and the specific vehicle electronic control modules 118 they are sent to) effect the desired Different Behavior. In other embodiments, the device 20 may send vehicle data port communications and commands to multiple vehicle electronic control modules 118, either in sequence or simultaneously, to effect a specific Different Behavior.

In one embodiment, the device 20 connects to multiple separate, distinct, and different communications systems (or data buses 140) on the vehicle data port 12, typically using differing pins on the data port connector 70. The device 20 may then send communications and commands to, and read vehicle operating parameters and conditions from, multiple vehicle electronic control modules 118 across several data buses 140.

In one embodiment, the device 20 monitors vehicle operating parameters and conditions. For example, based on those vehicle operating parameters and conditions, in some embodiments the device 20 sends communications and commands to the vehicle engine control module 112 to command the fuel injectors to be open or closed using a predetermined algorithm. In other embodiments, numerous other combinations of parameters and operating conditions and Different Behaviors being performed based on commands from the device 20 are also possible.

In one embodiment, the device 20, when commanding the fuel injectors with a Different Behavior, may disable a specific predetermined fuel injector to save fuel on only that cylinder. In another embodiment, the device 20 may alternate or cycle between disabling and enabling multiple fuel injectors to more evenly spread out the load across the cylinders. For example, the device 20 may sequentially command each fuel injector one by one.

As another example, the device 20 may command sets of fuel injectors and alternate and cycle between them, such as commanding injectors 1 & 8, followed by 2 & 7, followed by 3 & 6, followed by 4 & 5 (for an 8 cylinder engine). Spreading the load out across multiple cylinders (as opposed to always commanding the same injector or set of injectors) can help reduce engine wear or engine vibration. Other combinations and algorithms of fuel injector timing are possible, but regardless of what algorithm is used, and in what order the fuel injectors are commanded, the present system can improve fuel efficiency or engine performance.

In another embodiment, the device 20 monitors vehicle operating parameters and conditions and based on those vehicle operating parameters and conditions, the device 20 sends communications and commands to a vehicle electronic control module 118 to command the fuel injection system to alter the fuel timing parameters or alter fuel injection duration.

Vehicles on the road today utilize various fuel systems and pump arrangements such as a typical fuel injected engine having a single fuel pump situated in the fuel tank. Other arrangements include dual pumps in the fuel tank, direct injection with primary and secondary (or low and high pressure) fuel pumps, or other arrangements. In one embodiment, the device 20 monitors vehicle operating parameters and conditions and based on those vehicle operating parameters and conditions, the device 20 sends communications and commands to a vehicle electronic control module 118 to command the fuel system to increase, decrease, or alter fuel pressure or flow rate, or to alter fuel injection timing or duration.

In another embodiment, the device 20 monitors vehicle operating parameters and conditions and based on those vehicle operating parameters and conditions it sends communications and commands to the vehicle engine control module 112 to command the intake, exhaust, or other engine valves to have different lift, duration, position, or overlap using a predetermined algorithm, and without completely stopping all of the activity on any given valve.

In one embodiment, the device 20, when commanding the valves with a Different Behavior, may increase valve lift or duration (i.e. the amount of time the valve stays open) for just the intake valve of a predetermined cylinder. In another embodiment, the device 20, may command both the intake or exhaust valves simultaneously to alter valve timing for more than one valve in a single cylinder or for multiple valves across multiple cylinders. By commanding multiple valves simultaneously, the device 20 can alter valve overlap (that is, the amount of time that adjacent valves are open simultaneously) or alter other engine valve timing parameters. Additionally, by spreading the load out across valves on multiple cylinders (as opposed to always commanding the same valve or set of valves) can help reduce engine wear or engine vibration. Other combinations and algorithms of engine valve timing parameters are possible, but regardless of what algorithm is used, and in what order the engine valves are commanded, the present system can improve fuel efficiency or engine performance or both.

In another embodiment, the device 20 monitors vehicle operating parameters and conditions and based on those vehicle operating parameters and conditions it sends communications and commands to a vehicle electronic control module 118 to command a variable intake system to alter the intake geometry, for example to increase/decrease intake manifold/runner length or to alter intake manifold/runner volume.

In one embodiment, the device 20 monitors vehicle operating parameters and conditions and, based on those vehicle operating parameters and conditions, it sends communications and commands to a vehicle electronic control module 118 to command a transmission torque converter to lock or unlock the converter (that is, to prevent or allow slip across the converter) or to alter the torque converter slip speed or slip ratio. In another embodiment, the device 20 monitors vehicle operating parameters and conditions and, based on those vehicle operating parameters and conditions, it sends communications and commands to a vehicle electronic control module 118 to command one or more vehicle transmissions or transfer cases to set, shift, or hold a particular gear or to alter the shift points (that is, the predetermined point based on vehicle operating conditions that the vehicle would normally shift gears). In another embodiment, the device 20 may send communications and commands to alter the transmission (including a continuously variable transmission (CVT) and/or transfer case) gear ratio. In another embodiment, the device 20 may send communications and commands to alter the transmission line pressure or shift firmness (that is, how quickly the transmission engages from one gear to another, which effectively creates softer or harsher shifts).

In another embodiment, the device 20 monitors vehicle operating parameters and conditions and, based on those vehicle operating parameters and conditions, it sends communications and commands to a vehicle electronic control module 118 to command one or more vehicle engine speeds or electric motor speeds to be within a predetermined operating range. In one embodiment, the device 20 may command an engine or motor into a higher speed (or RPM) for performance benefits. In another embodiment, the device 20 may command an engine or motor into a lower speed (or RPM) for efficiency benefits.

In another embodiment, the device 20 monitors vehicle operating parameters and conditions and, based on those vehicle operating parameters and conditions, it sends communications and commands to a vehicle electronic control module 118 to command the vehicle speed to be within a predetermined operating range. In one embodiment, the device 20 may command the vehicle 10 to attain a higher speed or a lower speed, such as when entering or exiting an up-hill or down-hill condition. In another embodiment, the device 20 may command the vehicle 10 to alter vehicle acceleration or deceleration rates. In one embodiment, the device 20 may limit vehicle acceleration using engine braking commands or by limiting engine fuel, airflow, or timing. In another embodiment, the device 20 may command the vehicle 10 to come to a complete stop.

In another embodiment, the device 20 monitors vehicle operating parameters and conditions and, based on those vehicle operating parameters and conditions, the device 20 sends communications and commands to a vehicle electronic control module 118 to command one or more combustion engines to increase or decrease power or torque. In another embodiment, the device 20 may command one or more electric motors to increase or decrease power or torque output. In another embodiment, the device 20 may increase or decrease power or torque for multiple separate electric motors or motor systems at different rates (for example, the device 20 may adjust power or torque on vehicle front motors differently from the back motors, or one side motor differently from another side motor, or other configurations).

In another embodiment, the device 20 monitors vehicle operating parameters and conditions and, based on those vehicle operating parameters and conditions, it sends communications and commands to a vehicle electronic control module 118 to command one or more vehicle electric systems to increase or decrease commanded or actual electric current. In another embodiment, the device 20 commands increased or decreased electric current from a vehicle battery. In another embodiment, the device 20 commands increased or decreased electric current from a vehicle fuel cell, solar cell, or other electric fuel system.

In one embodiment, the device 20 monitors vehicle operating parameters and conditions and, based on those vehicle operating parameters and conditions, the device 20 sends communications and commands to a vehicle electronic control module 118 (such as an exhaust flow control module 116) to command one or more vehicle exhaust valves to open, start, close, stop, or alter exhaust flow. In another embodiment, the device 20 commands a vehicle electronic control module 118 (such as an exhaust flow control module 116) to command (that is, command the vehicle electronic control module to cause) increased, decreased, or altered exhaust noise, tone, or sound.

In some embodiments, the device 20 is attached to, connected to, or in communication with an aftermarket exhaust valve 132 that may be installed in a vehicle exhaust pipe 136, see FIG. 7. The device 20 monitors vehicle operating parameters and conditions and, based on those vehicle operating parameters and conditions, it sends communications or commands to the aftermarket exhaust valve 132. In one embodiment, the aftermarket exhaust valve communications and commands may open, start, close, stop or alter exhaust flow. In another embodiment, the aftermarket exhaust valve communications and commands may increase, decrease, or alter exhaust noise, tone, or sound.

In some embodiments, the device 20 may include multiple algorithms or combinations of Different Behaviors, from which it may choose based on the monitored vehicle operating parameters and conditions. For example, in one embodiment, the device 20 may command different fuel injector behavior only during driver braking conditions or low engine speed/rpm conditions. In another embodiment, the device 20 may command an aggressive behavior for engine valves during predetermined "high" engine speeds, and a non-aggressive behavior for engine valves during a predetermined "low" engine speed. Other combinations and algorithms of Different Behaviors, based on predetermined or user configured vehicle operating parameters and conditions, are possible, but regardless of what algorithm is used, and in what order the Different Behaviors are commanded, the present system can improve fuel efficiency or engine performance or both.

In some embodiments, the device 20 may include vehicle electronic control module communications and commands that command a Different Behavior, and that Different Behavior is designed to automatically stop immediately upon the device 20 being detached from the vehicle data port 12. In other embodiments, the device 20 sends vehicle electronic control module communications and commands to command a Different Behavior that is designed to automatically stop a short time after the device 20 is detached from the vehicle data port 12.

The device 20 typically monitors one or multiple vehicle operating parameters and conditions comprising such items as:

1-2 Shift Time,
12V Battery Estimated Temperature,
12V Circuit Current,
12V Circuit Temperature,
12V Circuit Voltage,
12V Conditions Met,
12V Enable Command,
2-3 Shift Time,
300V AC Isolation Status,
300V Charge Command,
300V DC Isolation Status,
300V Isolation Test Status,
3-4 Shift Time,
42V Circuit Current,
42V Circuit Maximum,
42V Circuit Temperature Status,
42V Circuit Temperature,
42V Circuit Voltage,
42V Enable Command,
4-5 Shift Time,
4WD Low Signal,
4WD Low,
4WD Signal,
4WD,
5 Volt Reference 1 Circuit Status,
5 Volt Reference 2 Circuit Status,
5 Volt Reference,
5-6 Shift Time,
A/C Clutch,
A/C Compressor Cycling Switch,
A/C High Side Pressure Sensor,
A/C High Side Pressure Switch,
A/C High Side Pressure,
A/C Mode Request Signal,
A/C Off for WOT,
A/C Pressure Disable,
A/C Relay Command,
A/C Request Signal,
A/C system refrigerant monitoring status,
ABS Active,
Accelerator Pedal Position Angle,
Accelerator Pedal Position,
Actual Engine—Percent Torque,
Air Flow Calculated,
Air Flow Rate/Mass Air Flow,
Air Fuel Ratio,
air/fuel ratio or lambda,
Alcohol Fuel Percentage,
all-wheel drive,
Ambient Air Temperature,
APM Voltage,
APP Indicated Angle,
APP Sensor Indicated Position,
Auto Start/Stop Fault,
Auto Start/Stop Override,
Auto Trans Neutral Drive Status,
Auxiliary Power Module 300V Circuit Current,
Auxiliary Power Module Heat Rate Temperature,
Auxiliary Power Module Power Loss,
Auxiliary Power Module Set Point,
Auxiliary Transmission Fluid Pump Actual,
Auxiliary Transmission Fluid Pump Command,
Auxiliary Transmission Fluid Pump Commanded,
Auxiliary Transmission Fluid Pump Fault Status,
Auxiliary Transmission Fluid Pump Relay,
Axle Torque Actual,
Axle Torque Commanded,
Axle Torque Immediate,
Barometer,
Barometric Pressure,
Battery Voltage Signal,
Battery voltage,
BECM HVIC Status,
BECM Maximum Voltage,
BECM Minimum Voltage,
Boost pressure system monitoring status,
BPP Circuit Signal,
BPP Signal,
Brake Booster Pressure Sensor,
Brake Booster Pressure,
Brake Pedal Pressed,
Brake Pedal Status,
Brake Pressure Sensor,
Brake Temp Status,
braking,
Calculated Hybrid Battery Current,
Calculated Hybrid Battery Resistance,
Calculated Hybrid Battery Voltage,
Calculated Starter Generator Torque,
Calculated Throttle Position,
Catalyst monitoring status,
Catalyst Temperature,
Catalytic Control Status,
Catalytic Converter Protection Active,
Catalytic Converter Protection,
Change Engine Oil Indicator Command,
CKP Active Counter,
CKP Resync Counter,
CKP Variation Learn Attempts,
Clutch Start Switch,
CMP Active Counter,
CMP Command,
CMP Sensor,
Cold Startup,
Commanded Gear,
Commanded Throttle Actuator Control,
Comprehensive component monitoring status,
Compression ignition monitoring status,
Contactor System Open Reason,
Contactor System Required Ckt Command,
Contactor System Required Signal,
Contactor System Requirement Ckt. Command,
Contactor System Status,
Control Module Voltage Signal,
Control module voltage,
Cooling Fan Command,
Cooling Fan Motor Commanded,
CPP Switch,
Crank Request Signal,
Cruise Control Active,
Cruise Disengage 1 History, Cruise Disengage 2 History,
Cruise Disengage 3 History,
Cruise Disengage 4 History,
Cruise Disengage 5 History,
Cruise Disengage 6 History,
Cruise Disengage 7 History,
Cruise Disengage 8 History,
Cruise On/Off Switch,
Current Gear,
Cycles of Misfire Data,
Cylinder Deactivation Performance Test,
Cylinder Deactivation System Command,
cylinder firing order,
Deactivation Inhibit APP High,
Deactivation Inhibit APP Rate High,
Deactivation Inhibit Axle Torque Limiting,
Deactivation Inhibit Brake Boost Pressure Sensor DTC,
Deactivation Inhibit Cylinder Deactivation Solenoid DTC,
Deactivation Inhibit Engine Coolant Temperature Low,
Deactivation Inhibit Engine Coolant Temperature Sensor DTC,
Deactivation Inhibit Engine Oil Pressure Sensor DTC,
Deactivation Inhibit Engine Oil Pressure,
Deactivation Inhibit Engine Oil Temperature,
Deactivation Inhibit Engine Overtemperature Protection,
Deactivation Inhibit Engine RPM,
Deactivation Inhibit Hot Coolant Mode,
Deactivation Inhibit Low Brake Booster Vacuum,
Deactivation Inhibit Manifold Vacuum Low,
Deactivation Inhibit MAP Sensor DTC,
Deactivation Inhibit Maximum Deactivation Time Exceeded,
Deactivation Inhibit Minimum Time On All Cylinders,
Deactivation Inhibit Oil Aeration,
Deactivation Inhibit Piston Protection,
Deactivation Inhibit TAC Ignition Voltage,
Deactivation Inhibit TAC System DTC,
Deactivation Inhibit Torque Reduction,
Deactivation Inhibit Transmission DLC Override,
Deactivation Inhibit Transmission Gear,
Deactivation Inhibit Transmission Range,
Deactivation Inhibit Transmission Shifting,
Deactivation Inhibit TWC Overtemperature Protection,
Deactivation Inhibit Vehicle Speed Sensor DTC,
Deactivation Inhibit Vehicle Speed Sensor Low with Torque Converter Clutch On,
Deceleration Fuel Cutoff,
Desired APM Voltage,
Desired Exh. CMP,
Desired Fan Speed,
Desired Fuel Rail Pressure,
Desired Hybrid Battery SoC,
Desired Idle Speed,
Desired Int. CMP,
Desired Starter Gen Torque,
DFCO Active Time,
Diagnostic Trouble Code Count,
Diagnostic Trouble Code Status,
Diagnostic Trouble Codes (DTCs),
Direction IMS D1,
Direction IMS D2,
Direction IMS R1,
Direction IMS R2,
Direction IMS S,
Direction IMS,
Distance since diagnostic trouble codes cleared,
Distance Since DTC Failure,
Distance Since First Failure,
Distance Since Last Failure,
Distance Travelled While MIL is Activated,
Distance with Cylinders Activated,
Distance with Cylinders Deactivated,
DMCM Cint. Pump 1 Command,
DMCM Cint. Pump 1 Open Test Status,
DMCM Cint. Pump 1 Short to Ground Test Status,
DMCM Cint. Pump 1 Short to Voltage Test Status,
DMCM Coolant Temperature,
Driver Axle Torque Request,
Driver Seat Belt Switch,
Driver Seat Position Sensor,
Driver Shift Control,
Driver Shift Request,
Driver's Demand Engine—Percent Torque,
Driving cycle status,
DRP Active,
DRP Disabled,
Driver Axle Torque Request,
DTC that caused required freeze frame data storage,
EC Ignition Command,
EC Ignition Relay Feedback Signal,
ECM Challenge Status,
ECM Des. Contactor Position,
ECM Fault,
ECM Request,
Economy Lamp Command,
EGR Status,
EGR system monitoring status,
Emission requirements to which vehicle is designed,
Emissions monitor status,
Engine Auto Start Times,
Engine Coolant Circulation Pump Relay Command,
Engine Coolant Temperature,
Engine Fuel Rate,
Engine Load,
Engine Off EVAP Test Conditions Met,
Engine Oil Indicator Command,
Engine Oil Level Switch,
Engine Oil Life Remaining,
Engine Oil Pressure Sensor,
Engine Oil Pressure Switch,
Engine Oil Temperature,
Engine Percent Torque At Idle,
Engine Percent Torque,
Engine Reference Torque,
Engine RPM,
Engine Run Time,
engine timing,
Engine Torque Actual,
Engine Torque Commanded,
Engine Torque,
EVAP Purge Solenoid Command,
EVAP Vent Solenoid Command,
Evaporative Purge Status,
Evaporative system monitoring status,
Evaporative System Vapor Pressure,
Exh. CMP Variance,
Exh. CMP Active Counter,
Exh. CMP Angle,
Exh. CMP Command,
Exhaust gas sensor monitoring status,
Exhaust Pressure,
External Travel BPP Signal,
Fail Counter, Fan Speed,
FC Relay Command,
four-wheel drive,
fuel economy,
fuel flow rate,
Fuel Injection Timing,
Fuel Injector Disabled Due to Misfire,
Fuel Injector Status,
Fuel Level Remaining,
Fuel Level Sensor,
Fuel Level,
fuel pressure,
Fuel Pump Command,
Fuel Pump Current,
Fuel Pump Driver Input Duty cycle,
Fuel Pump Driver Input Frequency,
Fuel Pump Driver Output Duty Cycle,
Fuel Pump Driver Temperature,
Fuel Pump Operating Status,
Fuel Pump Relay 2 Command,
Fuel Pump Relay Command,
Fuel Pump Signal Command,
Fuel Pump Speed,
Fuel Rail Pressure relative to manifold vacuum,
Fuel Rail Pressure Sensor,
Fuel Rail Pressure,
Fuel Sensor Right Tank,
Fuel Status,
Fuel system monitoring status,
Fuel system status,
Fuel Tank Pressure Sensor,
Fuel Tank Pressure,
Fuel Tank Rated Capacity,
Fuel Trim Average,
Fuel Trim Cell,
Fuel Trim Learn,
Fuel Trim Test Average without Purge,
Fuel Trim Test Average,
Fuel Trim,
Fuel type,
Fuel/Air Commanded Equivalence Ratio (lambda),
gear position,
Gear Ratio,
Gen L-Terminal Signal Command,
Gen L-Terminal Signal Command,
GEN L-Terminal Signal,
Generator F-Terminal Signal,
Generator L-Terminal Command,
Generator Starter Field Current,
Generator Starter Rotor Position,
Glow Plug Lamp Status,
GPS position information,
Heated catalyst monitoring status,
Heated Oxygen Sensor Command,
Heated Oxygen Sensor Heater,
Heated Oxygen Sensor Status,
Hill Hold Indicator Command,
Hill Hold Solenoid 1,
Hill Hold Solenoid 2,
HO2S 1 Heater Command,
HO2S 2 Heater Command,
HO2S Bank 1 Sensor 1 Heater Command,
HO2S Bank 1 Sensor 2 Heater Command,
HO2S Bank 2 Sensor 1 Heater Command,
HO2S Bank 2 Sensor 2 Heater Command,
Hood Open Indicator Command,
Hot Open Loop,
HPCM 300V Circuit,
HPCM Authentication Status,
HPCM HVIC Status,
HPCM Response Source,
HPCM/ECM Challenge Status,
HVIC Return Current,
HVIC Source Current,
Hybrid System,
Hybrid Battery 1,
Hybrid Battery 2,
Hybrid Battery 3,
Hybrid Battery 4,
Hybrid Battery 5,
Hybrid Battery 6,
Hybrid Battery 7,
Hybrid Battery 8,
Hybrid Battery 9,
Hybrid Battery 10,
Hybrid Battery 11,
Hybrid Battery 12,
Hybrid Battery 13,
Hybrid Battery 14,
Hybrid Battery 15,
Hybrid Battery 16,
Hybrid Battery 17,
Hybrid Battery 18,
Hybrid Battery 19,
Hybrid Battery 20,
Hybrid Battery Average Cell Temperature,
Hybrid Battery Cumulative Charge Amp Hours,
Hybrid Battery Cumulative Discharge Amp Hours,
Hybrid Battery Current Sensor,
Hybrid Battery Current,
Hybrid Battery Discharge Power Available,
Hybrid Battery High Current Sensor,
Hybrid Battery Inlet Air Temperature Sensor,
Hybrid Battery Inlet Air Temperature,
Hybrid Battery Low Current Sensor,
Hybrid Battery Max Cell Temperature,
Hybrid Battery Min Cell Temperature,
Hybrid Battery Mod 1 Temperature Sensor,
Hybrid Battery Mod 1 Temperature,
Hybrid Battery Mod 2 Temperature Sensor,
Hybrid Battery Mod 2 Temperature,
Hybrid Battery Mod 3 Temperature Sensor,
Hybrid Battery Mod 3 Temperature,
Hybrid Battery Mod 4 Temperature Sensor,
Hybrid Battery Mod 4 Temperature,
Hybrid Battery Mod 5 Temperature Sensor,
Hybrid Battery Mod 5 Temperature,
Hybrid Battery Mod 6 Temperature Sensor,
Hybrid Battery Outlet Air Temperature Sensor,
Hybrid Battery Outlet Air Temperature,
Hybrid Battery Pack Calculated,
Hybrid Battery Pack Fan Commanded,
Hybrid Battery Pack Fan Sensor,
Hybrid Battery Pack Fan Speed,
Hybrid Battery Pack Power,
Hybrid Battery Pack Remaining Charge,
Hybrid Battery Pack Voltage,
Hybrid Battery Power Available,
Hybrid Battery SoC,
Hybrid Battery Terminal,
Hybrid Battery Voltage,
Hybrid Motor 1 Current Commanded,
Hybrid Motor 1 Phase U Current,
Hybrid Motor 1 Phase V Current, Hybrid Motor 1 Phase W Current,
Hybrid Motor 1 Resolver Angle,
Hybrid Motor 1 Resolver Offset,
Hybrid Motor 1 Speed Actual,
Hybrid Motor 1 Temperature Sensor,
Hybrid Motor 1 Temperature,
Hybrid Motor 1 Torque Actual,
Hybrid Motor 1 Torque Commanded,
Hybrid Motor 2 Current Commanded,
Hybrid Motor 2 Phase U Current,
Hybrid Motor 2 Phase V Current,
Hybrid Motor 2 Phase W Current,
Hybrid Motor 2 Resolver Angle,
Hybrid Motor 2 Resolver Offset,
Hybrid Motor 2 Speed Actual,
Hybrid Motor 2 Temperature Sensor,
Hybrid Motor 2 Temperature,
Hybrid Motor 2 Torque Actual,
Hybrid Motor 2 Torque Commanded,
Hybrid System Voltage,
Hybrid Transmission Mode Actual,
Hybrid Transmission Mode Commanded,
ICE Cranking Speed Commanded,
ICE Cranking Status,
ICE Status,
Ignition Accessory Signal,
Ignition Crank,
Ignition Off Time,
Ignition Timing Advance,
ignition timing or spark advance,
Ignition Voltage Signal,
Ignition Voltage,
IMS Range,
Initial Brake Signal,
Injector Pulse Width,
Int. CMP Variance,
Int. CMP Active Counter,
Int. CMP Angle,
Int. CMP Command,
Intake Air Temperature,
Intake Manifold Pressure,
Isolation Test Resistance,
ISS/OSS Supply Voltage,
Knock Detected,
Knock Retard,
KS Active Counter,
Last Shift Time,
Lateral Accelerometer Signal,
Left Front Inlet ABS Solenoid,
Left Front Outlet ABS Solenoid,
Left Front Wheel Speed,
Left Rear Inlet ABS Solenoid,
Left Rear Outlet ABS Solenoid,
Left Rear Wheel Speed,
Left TCS Isolation Solenoid Command,
Left TCS Prime Solenoid Command,
Long Term Fuel Pump Trim,
Long Term Fuel Trim,
Loop 1 Type,
Loop 2 Type,
Loop 3 Type,
Loop 4 Type,
Loop 5 Type,
Loop 6 Type,
Loop 7 Type,
Loop 8 Type,
Loop 9 Type,
Loop 10 Type,
Loop 11 Type,
Loop 12 Type,
Loop Status,
Low Engine Oil Level Indicator Command,
Low Engine Oil Pressure Indicator Command,
MAF Performance Test,
MAF Sensor,
Malfunction Indicator Lamp (MIL) Status,
manifold pressure,
Manual Trans Neutral Gear Status,
MAP Performance Test 1,
MAP Performance Test 2,
MAP Sensor,
Mass Air Flow Sensor Status,
mass air flow,
Maximum Hybrid Battery Module Voltage,
MIL Command,
MIL Requested By DTC,
Minimum Hybrid Battery Module Voltage,
Minutes run by the engine while MIL activated,
Misfire Current,
Misfire History,
Misfire monitoring status,
NMHC catalyst monitoring status,
Non-Driven Wheel Speed,
Not Run Counter,
NOx aftertreatment monitoring status,
Number of warm-ups since diagnostic trouble codes cleared,
On Board Diagnostic System Type,
Output Shaft Speed,
Oxygen Sensor Current,
Oxygen Sensor Equivalence Ratio (lambda),
Oxygen Sensor Fuel Trim,
Oxygen sensor heater monitoring status,
Oxygen Sensor Location,
Oxygen sensor monitoring status,
Oxygen Sensor Status,
Oxygen Sensor Voltage,
Parking Brake Status,
Pass Counter,
Passenger Seat Belt Switch,
Passenger Seat Position Sensor,
PC Solenoid 1 CKT Status,
PC Solenoid 1 Line Pressure Command,
PC Solenoid 2 CKT Status,
PC Solenoid 2 Line Pressure Command,
PC Solenoid 3 CKT Status,
PC Solenoid 3 Line Pressure Command,
PC Solenoid 4 CKT Status,
PC Solenoid 4 Line Pressure Command,
PC Solenoid 5 CKT Status,
PC Solenoid 5 Line Pressure Command,
PCM/VCM in VTD Fail Enable,
Phase U Current Offset,
Phase U Inverter Temperature,
Phase V Current Offset,
Phase V Inverter Temperature,
Phase W Current Offset,
Phase W Inverter Temperature,
PM filter monitoring status,
PNP Switch,
Power Enrichment,
Power Take Off (PTO) Status,
Power Take Off,
Primary Key Status, PTO Remote Start Request Signal,
Pump Motor Relay Commanded,
Pump Motor Relay Feedback,
Received Primary Key,
Reduced Engine Power,
Regen. Brake Torque Predicted,
Regen. Brake Torque Request,
Resolver Learned,
Right Front Inlet ABS Solenoid,
Right Front Outlet ABS Solenoid,
Right Front Wheel Speed,
Right Rear Inlet ABS Solenoid,
Right Rear Outlet ABS Solenoid,
Right Rear Wheel Speed,
Right TCS Isolation Solenoid Command,
Right TCS Prime Solenoid Command,
Rollover Sensor,
Rough Road Detected,
Run/Crank,
Run/Crank Mode,
Secondary Air Status,
Secondary air system monitoring status,
Secondary Key Status,
Secondary Oxygen Sensor Current,
Secondary Oxygen Sensor Equivalence Ratio (lambda),
Secondary Oxygen Sensor Fuel Trim,
Secondary Oxygen Sensor Location,
Secondary Oxygen Sensor Status,
Secondary Oxygen Sensor Voltage,
Sensor 1 Type,
Sensor 2 Type,
Sensor 3 Type,
Sensor 4 Type,
Sensor 5 Type,
Sensor 6 Type,
SGCM 12 Volt Converter,
SGCM Converter Temperature,
SGCM Des. Contactor Position,
SGCM Internal Temperature,
SGCM Inverter Temperature,
Shift Solenoid 1,
Shift Solenoid 2,
Short Term Fuel Pump Trim,
Short Term Fuel Trim,
SIR Warning Indicator,
Skip Shift Lamp Command,
Skip Shift Solenoid Command,
Solenoid Relay Commanded,
Solenoid Relay Feedback,
Starter Generator Belt Slip,
Starter Generator Speed,
Starter Relay Command,
Startup IAT,
Startup Intake Air Temperature,
Steering Wheel Angle,
Switched Battery Voltage Signal,
System Voltage,
TAC Forced Engine Shutdown,
TAC Motor Command,
TAC Motor,
TB Idle Airflow Compensation,
TCC Brake Switch,
TCC PC Solenoid Pressure Command,
TCC Slip Speed,
TCC/Cruise Brake Pedal Switch,
TCS Active,
TCS Enabled,
TCS Torque Delivered Signal,
TCS Torque Request Signal,
TFP Switch 1,
TFP Switch 2,
TFP Switch 3,
TFP Switch 4,
TFP Switch 5,
Throttle Position,
Time since diagnostic trouble codes cleared,
Time Since Engine Start,
Torque Delivered Signal,
Torque Management Spark Retard,
Torque Request Inhibit—Fuel,
Torque Request Inhibit—Minimum Idle Inhibit,
Torque Request Inhibit—Minimum Torque,
Torque Request Inhibit—Spark Advance,
Torque Request Inhibit—Spark,
Torque Request Inhibit—TAC Limit,
Torque Request Inhibit—TAC,
Total Brake Torque,
Total Misfire,
TP Desired Angle,
TP Indicated Angle,
TP Performance Test,
TP Sensor 1 Learned Minimum,
TP Sensor 2 Learned Minimum,
TP Sensor Indicated Position,
TP Sensors 1 and 2,
Traction Control Status,
trailer brake status,
Transfer Case OSS,
Transfer Case Ratio,
Transmission Fluid Temperature,
Transmission Full Feed Fill Pressure,
Transmission Input Shaft Speed,
Transmission Output Shaft Speed,
transmission status,
Transmission Switch,
Turbine Speed,
TWC Mon. Bank 1 Test Count,
TWC Mon. Bank 2 Test Count,
TWC Temperature Calculated,
Vacuum Calculated,
vehicle location,
Vehicle Speed Circuit 2 Status,
Vehicle Speed Circuit Status,
Vehicle Speed,
VES Actuator Command,
VES Actuator Feedback,
VES Failed,
VSES Active,
VSES Enabled,
VSES is Centered,
VTD Auto Learn Counter,
VTD Auto Learn Timer Active,
VTD Auto Learn Timer,
VTD Fuel Disable Until Ignition Off,
VTD Fuel Disable,
VTD Fuel Enabled,
VTD Password Learn Scan Tool Delay,
VTD Password Learn Enabled,
VTD Password Learned,
VTD Security Code Accepted,
VTD Security Code Lockout,
VTD Security Code Programmed,
VTD Security Info Programmed,
VTD Security Information Programmed, VTD System Status,
VVT system monitoring status,
Warm-ups w/o Emission Faults,
Warm-ups w/o Non-Emission Faults,
Warm-Ups without Emission Faults,
Warm-Ups without Non-Emission Faults,
Wide Open Throttle, and
Yaw Rate Signal.

In some embodiments, the device 20 allows the vehicle operator or other user to introduce new data by way of custom calculations using vehicle operating parameters and condition data obtained from a vehicle data port 12 as well as sensor or other data obtained using sensors on the device itself or from a peripheral input port 78. The device 20 can then use this new data in conjunction with algorithms that command Different Behaviors for the various vehicle systems. In other embodiments, the device 20 allows a vehicle operator or other user to further configure the device 20 operation and thereby cause the device 20 to command Different Behavior limits or operations.

The present system allows a user to improve vehicle performance or efficiency using a device 20 plugged into the vehicle data port 12. The device 20 can easily be unplugged and removed without having made any permanent alterations to the vehicle 10. Thus, the present system has several advantages over the prior art. It will be obvious to those of skill in the art that the invention described in this specification and depicted in the FIGURES may be modified to produce different embodiments. Although embodiments of the invention have been illustrated and described, various modifications and changes may be made by those skilled in the art without departing from the spirit and scope of the invention.

The invention claimed is:

1. A system for monitoring and controlling operating parameters of a moving vehicle comprising:
    a device adapted to be removably attached to a vehicle diagnostic data port;
    the device being capable of communicating through the diagnostic data port with at least one built-in or factory-installed vehicle electronic control module, audible warning chime, gauge, visual warning light, or other display; and
    the device incorporating a predetermined set of one or more of (i) vehicle operating parameters or conditions, (ii) communications settings and (iii) commands;
    wherein the device monitors at least one vehicle operating parameter or condition that is within desired and normal vehicle operational limits to detect when vehicle performance or efficiency or operation may be improved or altered in a useful way; and
    wherein the device communicates with and sends data port communications and commands to at least one vehicle electronic control module, which data port communications and commands alter normal factory behavior of the at least one vehicle electronic control module to perform a different behavior than it would otherwise have performed without modifying the at least one vehicle electronic control module while ensuring vehicle operating parameters remain within desired and normal limits, the different behavior comprising at least one of:
(a) enable or disable one or more fuel injectors;
(b) increase or decrease intake or exhaust valve lift, duration, position, or overlap without completely stopping valve activity;
(c) increase or decrease fuel injection timing or duration;
(d) increase or decrease or vary intake geometry, runner length, or volume;
(e) increase or decrease fuel pressure or fuel pump output;
(f) alter transmission shift points;
(g) set or hold a predetermined transmission gear;
(h) increase or decrease transmission gear ratio;
(i) increase or decrease transmission line pressure or shift firmness;
(j) limit vehicle speed to a predetermined operating range;
(k) limit acceleration rate to a predetermined maximum rate;
(l) increase or decrease commanded or actual power or torque output;
(m) increase or decrease commanded or actual electric current;
(n) bring the vehicle to a stop;
(o) limit engine or motor speed to a predetermined operating range; and
(p) lock or unlock the torque converter or alter the slip speed.

2. The system of claim 1 wherein the device alternates between enabling or disabling a plurality of fuel injectors or sets of fuel injectors in a predetermined order to even out the load across the plurality of fuel injectors or sets of fuel injectors.

3. The system of claim 1 wherein the device alternates between increasing or decreasing valve lift, duration, position, or overlap without completely stopping valve activity for a plurality of intake or exhaust valves in a predetermined order to even out the load across the plurality of intake or exhaust valves.

4. The system of claim 1 wherein the device increases or decreases valve lift, duration, position, or overlap without completely stopping valve activity for a second intake or exhaust valve based in part on how the device increases or decreases valve, life, duration, position, or overlap without completely stopping valve activity for a first intake or exhaust valve.

5. The system of claim 1 wherein the different behavior stops immediately upon or shortly after the device is detached from the vehicle data port.

6. The system of claim 1 wherein the device alters the commanded different behavior in a predetermined manner in response to at least one of an acceleration condition, a braking condition, a coasting condition, or an engine idle condition.

7. The system of claim 1 wherein the device contains a data storage area and can be configured to data log vehicle operating parameters or other vehicle information, events, and conditions.

8. The system of claim 1 wherein the device has peripheral input ports to allow the device to obtain data from external sources and act upon that data by altering the commanded different behavior in a predetermined way.

9. The system of claim 1 wherein the device alters the different behavior in a predetermined way upon receipt of an event initiated by the vehicle operator or other user.

10. The system of claim 9 wherein the event initiated by the vehicle operator or other user is an action of pressing, actuating, moving, turning, or gesturing with respect to a built-in vehicle button, switch, knob, touch input display, or sensor.

11. The system of claim 9 wherein the event initiated by the vehicle operator or other user is the action of pressing, actuating, moving, turning, or gesturing with respect to a button, switch, knob, touch input display, or sensor on said device or connected to said device via a peripheral input port.

12. The system of claim 1 wherein the device provides feedback to the vehicle operator or other user by at least one of:
  (a) sounding a built-in or factory-installed vehicle audible chime;
  (b) illuminating a built-in or factory-installed vehicle warning light; and
  (c) displaying text, data, or other information on a built-in or factory-installed vehicle gauge or other display.

13. The system of claim 1 wherein the device provides feedback to the vehicle operator or other user by at least one of:
  (a) sounding a speaker inside of, attached to, connected to or on said device;
  (b) providing sound over an audio output connector on said device;
  (c) illuminating an indicator light inside of, attached to, connected to, or on said device; and
  (d) displaying text, data, or other information on a display inside of, attached to, connected to, or on said device.

14. A system for monitoring and controlling operating parameters of a moving vehicle having an exhaust system comprising:
  a device adapted to be removably attached to a vehicle diagnostic data port;
  the device being capable of communicating through the diagnostic data port with at least one built-in or factory-installed vehicle electronic control module, audible warning chime, gauge, visual warning light, or other display; and
  the device incorporating a predetermined set of one or more of (i) vehicle operating parameters or conditions, (ii) communications settings and (iii) commands;
  wherein the device monitors at least one vehicle operating parameter or condition that is within desired and normal vehicle operational limits to detect when vehicle performance or efficiency or operation may be improved or altered in a useful way; and
  wherein the device communicates with and sends data port communications and commands to at least one vehicle electronic control module, which data port communications and commands alter normal factory behavior of the at least one vehicle electronic control module to perform a different behavior than it would otherwise have performed without modifying the at least one vehicle electronic control module while ensuring vehicle operating parameters remain within desired and normal limits, the different behavior comprising at least one of:
  (a) open or start exhaust flow;
  (b) close or stop exhaust flow;
  (c) alter exhaust flow;
  (d) increase exhaust noise, tone, or sound;
  (e) decrease exhaust noise, tone, or sound; and
  (f) alter exhaust noise, tone, or sound.

15. The system of claim 14 wherein the different behavior stops immediately upon or shortly after the device is detached from the vehicle data port.

16. The system of claim 14 wherein the device alters the commanded different behavior in a predetermined manner in response to at least one of an acceleration condition, a braking condition, a coasting condition, or an engine idle condition.

17. The system of claim 14 wherein the device contains a data storage area and can be configured to data log vehicle operating parameters or other vehicle information, events, and conditions.

18. The system of claim 14 wherein the device has peripheral input ports to allow the device to obtain data from external sources and act upon that data by altering the commanded different behavior in a predetermined way.

19. The system of claim 14 wherein the device alters the different behavior in a predetermined way upon receipt of an event initiated by the vehicle operator or other user.

20. The system of claim 19 wherein the event initiated by the vehicle operator or other user is an action of pressing, actuating, moving, turning, or gesturing with respect to a built-in vehicle button, switch, knob, touch input display, or sensor.

21. The system of claim 19 wherein the event initiated by the vehicle operator or other user is the action of pressing, actuating, moving, turning, or gesturing with respect to a button, switch, knob, touch input display, or sensor on said device or connected to said device via a peripheral input port.

22. The system of claim 14 wherein the device provides feedback to the vehicle operator or other user by at least one of:
  (a) sounding a built-in or factory-installed vehicle audible chime;
  (b) illuminating a built-in or factory-installed vehicle warning light; and
  (c) displaying text, data, or other information on a built-in or factory-installed vehicle gauge or other display.

23. The system of claim 14 wherein the device provides feedback to the vehicle operator or other user by at least one of:
  (a) sounding a speaker inside of, attached to, connected to or on said device;
  (b) providing sound over an audio output connector on said device;
  (c) illuminating an indicator light inside of, attached to, connected to, or on said device; and
  (d) displaying text, data, or other information on a display inside of, attached to, connected to, or on said device.

24. A system for monitoring vehicle operating parameters and controlling an aftermarket exhaust valve attached to a moving vehicle comprising:
  a device adapted to be removably attached to a vehicle diagnostic data port;
  the device being capable of communicating through the diagnostic data port with at least one built-in or factory-installed vehicle electronic control module, audible warning chime, gauge, visual warning light, or other display; and
  the device incorporating a predetermined set of one or more of (i) vehicle operating parameters or conditions, (ii) communications settings and (iii) commands;
  the device being attached to, connected to, or in communication with an aftermarket exhaust valve and the device being capable of commanding, controlling, or instructing the aftermarket exhaust valve in a predetermined way while keeping the exhaust valve operating within desired and normal operational limits;
  wherein the device may be configured to monitor at least one vehicle operating parameter or condition that is within desired and normal vehicle operational limits to detect when performance or efficiency or operation may be improved or altered in a useful way; and
  wherein the device communicates with and sends commands to the aftermarket exhaust valve, the aftermarket exhaust valve communications and commands being based in part on monitored vehicle operating parameters and conditions and the communications and commands alter the performance of the exhaust valve while ensuring vehicle operating parameters remain within desired and normal limits.

25. The system of claim 24 wherein the aftermarket exhaust valve communications and commands perform at least one of:
(a) open or start exhaust flow;
(b) close or stop exhaust flow;
(c) alter exhaust flow;
(d) increase exhaust noise, tone, or sound;
(e) decrease exhaust noise, tone, or sound; and
(f) alter exhaust noise, tone, or sound.

26. The system of claim 24 wherein the device alters the aftermarket exhaust valve communications and commands in a predetermined way upon receipt of an event initiated by the vehicle operator or other user.

27. The system of claim 26 wherein the event initiated by the vehicle operator or other user is an action of pressing, actuating, moving, turning, or gesturing with respect to a built-in vehicle button, switch, knob, touch input display, or sensor.

28. The system of claim 26 wherein the event initiated by the vehicle operator or other user is the action of pressing, actuating, moving, turning, or gesturing with respect to a button, switch, knob, touch input display, or sensor on said device or connected to said device via a peripheral input port.

29. The system of claim 24 wherein the device provides feedback to the vehicle operator or other user by at least one of:
(a) sounding a built-in or factory-installed vehicle audible chime;
(b) illuminating a built-in or factory-installed vehicle warning light; and
(c) displaying text, data, or other information on a built-in or factory-installed vehicle gauge or other display.

30. The system of claim 24 wherein the device provides feedback to the vehicle operator or other user by at least one of:
(a) sounding a speaker inside of, attached to, connected to or on said device;
(b) providing sound over an audio output connector on said device;
(c) illuminating an indicator light inside of, attached to, connected to, or on said device; and
(d) displaying text, data, or other information on a display inside of, attached to, connected to, or on said device.

\* \* \* \* \*